United States Patent
Gerling

Patent Number: 6,008,554
Date of Patent: *Dec. 28, 1999

[54] CLAW-POLE STEPPER MOTOR HAVING A ROTOR SUPPORTED BY AN AXIAL BEARING AND A ROTOR-MAGNET EXTENDING BEYOND AN END OF A STATOR RETURN ELEMENT

[75] Inventor: Dieter Gerling, Aachen, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/761,572

[22] Filed: Dec. 6, 1996

[30] Foreign Application Priority Data

Dec. 21, 1995 [DE] Germany ............................ 195 47 895

[51] Int. Cl.⁶ .......................... H02K 37/14; H02K 37/24; H02K 7/06
[52] U.S. Cl. ...................... 310/49 R; 310/49 A; 310/257
[58] Field of Search ................................ 310/49 R, 156, 310/80, 257, 164, 49 A; 74/89.15

[56] References Cited

U.S. PATENT DOCUMENTS 5,220,224  6/1993  Bosman et al. ....................... 310/49 R

FOREIGN PATENT DOCUMENTS

0550102A2  7/1993  European Pat. Off. ............. 310/49 R
59025542   2/1984  Japan ............................... H02K 7/06
62-171454  7/1987  Japan .................................... 310/49 R

*Primary Examiner*—Nestor Ramirez
*Assistant Examiner*—Karl Tamai
*Attorney, Agent, or Firm*—Robert J. Kraus

[57] ABSTRACT

Stator elements each accommodate at least one stator coil (5, 6), and a rotor (2) comprises a permanent magnet (10) which is axially supported by means of at least one axial bearing (11), the rotor (2) having an inner screwthread (12) in which a threaded spindle (13) is engageable. The permanent magnet (10) of the rotor (2) projects beyond the respective outer end (7, 8) of the stator return element (3, 4) at at least one axial end (10a, 10b), in such a manner that in spite of a displacement of the rotor (2) as a result of bearing tolerances of the axial bearing (11) substantially the entire electromagnetic field of the stator coils (5, 6) is linked to the rotor (2).

3 Claims, 1 Drawing Sheet

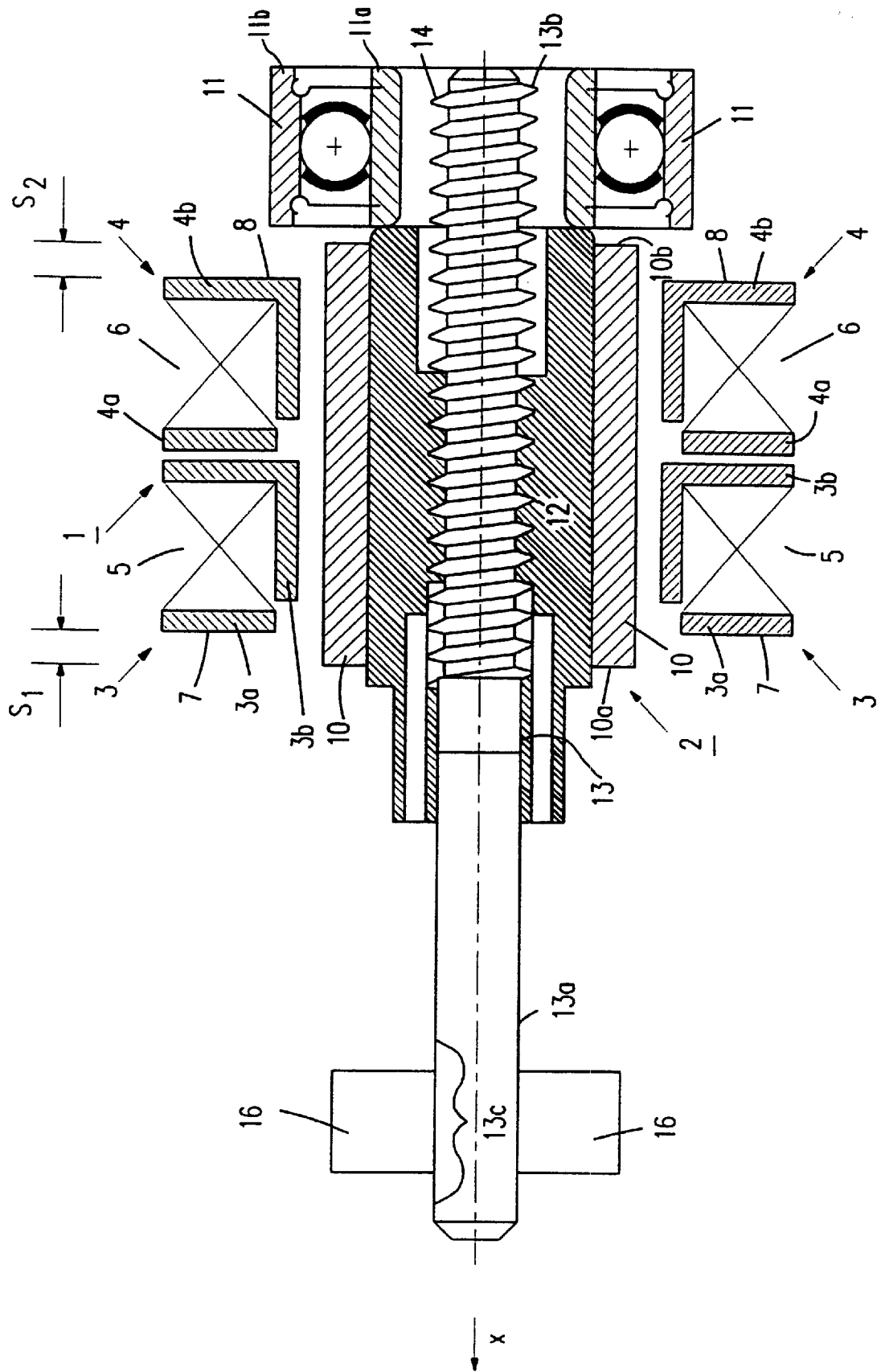

6,008,554

CLAW-POLE STEPPER MOTOR HAVING A ROTOR SUPPORTED BY AN AXIAL BEARING AND A ROTOR-MAGNET EXTENDING BEYOND AN END OF A STATOR RETURN ELEMENT

BACKGROUND OF THE INVENTION

The invention relates to a claw-pole stepper motor having a stator which comprises at least two stator return elements bounded by outer sides, which elements each accommodate at least one stator coil, and having a rotor which comprises a permanent magnet and which is axially supported by means of at least one axial bearing, the rotor having an inner screwthread in which a threaded spindle is engageable.

Such a claw-pole stepper motor is known from EP 550 102 A2. Claw-pole stepper motors have no winding overhangs and the stator is bounded by a stator return element, for example a stator plate, at both axial ends. As a result, the axial length of the permanent magnet of the rotor of such a known claw-pole stepper motor is smaller than or equal to the axial distance between the outer ends of the stator return elements, in order to minimize the amount of permanent-magnet material. If the threaded spindle is locked against rotation a rotation of the rotor will be converted into an axial movement of the threaded spindle. If the threaded spindle is used, for example, to drive an actuating member, oppositely directed reaction forces will act upon the threaded spindle during its axial movement. These axial reaction forces may cause a displacement of the rotor in an axial direction owing to bearing tolerances of the axial bearing. As a result of such an axial displacement of the rotor, the electromagnetic flux generated by one of the two stator coils is no longer completely linked to the rotor, which leads to a reduction of the torque produced by the motor. In order to preclude the axial displacement of the rotor bearings having a very high axial stiffness have to be used and the claw-pole stepper motor should be manufactured with a very high mechanical precision. This results in high production costs for the motor.

SUMMARY OF THE INVENTION

It is an object of the invention to provide a claw-pole stepper motor of the type defined in the opening paragraph, which can be manufactured as cheaply as possible with substantially the same volume, the same weight and the same load characteristics under axial load of the threaded spindle.

According to the invention this object is achieved in that the permanent magnet of the rotor projects beyond the outer end of the stator return element at at least one axial end, in such a manner that in spite of a displacement of the rotor as a result of bearing tolerances of the axial bearing substantially the entire electromagnetic field of the stator coils is linked to the rotor.

As a result of the axial extension of the permanent magnet of the rotor beyond the associated outer end of the stator return element, an axial displacement of the rotor not greater than the axial extension of the permanent magnet of the rotor does not cause a reduction of the electromagnetic linkage of the flux produced by the stator coils to the rotor and, consequently, does not cause a reduction of the torque. This makes it possible to construct the claw-pole stepper motor with simpler bearings having a lower axial stiffness and to impose less stringent requirements on the mechanical production accuracy of the claw-pole stepper motor and the parts of the claw-pole stepper motor. These measures lead to a substantial cost reduction, whereas the axial extension of the permanent magnet of the rotor beyond the outer side of the stator return element requires only little extra cost.

All in all, this results in a claw-pole stepper motor which can be manufactured substantially cheaper while the load characteristics under axial load remain the same.

An advantageous embodiment of the invention is characterized in that the permanent magnet of the rotor projects from the respective outer side of the stator return element over at least 5% of the overall length of the permanent magnet of the rotor.

In practice, an extension of this order of magnitude has proved to be very advantageous.

Another advantageous embodiment of the invention is characterized in that the permanent magnet of the rotor projects beyond the respective outer ends of the stator return element at both axial ends.

If the permanent magnet of the rotor is axially extended beyond both outer ends it can exert both a compressive force and a tensile force on an actuating member, without an axial displacement caused by bearing tolerances leading to a torque reduction as a result of a smaller flux linkage from the stator to the rotor.

A further advantageous embodiment of the invention is characterized in that the permanent magnet of the rotor projects beyond the respective outer ends of the stator return element at both axial ends over at least 5% of the overall length of the permanent magnet of the rotor.

BRIEF DESCRIPTION OF THE DRAWING

The sole FIGURE is an axial cross section of the stepper motor according to the invention.

DETAILED DESCRIPTION OF THE PREFERRED EMBODIMENT

The single FIGURE of the drawing shows a claw-pole stepper motor comprising a stator 1 and a rotor 2. The stator 1 comprises a first stator return element 3 and a second stator return element 4. The first stator return element 3 comprises a first stator plate 3a and a second stator plate 3b. The second stator return element 4 comprises a third stator plate 4a and a fourth stator plate 4b. The first stator return element 3 accommodates a first stator coil 5. The second stator return element 4 accommodates a second stator coil 6. The first stator return element 3 is bounded by a first outer end 7 and the second stator return element 4 is bounded by a second outer end 8.

The rotor 2 comprises a permanent magnet 10 having a first axial end 10a and a second axial end 10b. The axial ends 10a and 10b of the permanent magnet 10 extend beyond the respective outer ends 7 and 8 of the stator return elements 3 and 4, respectively, over a distance $S_1$ and $S_2$, respectively. The rotor 2 is supported by means of the inner race 11a of an axial bearing 11, the outer race 11b being fixed with respect to the stator. The rotor 2 has an internal screwthread 12 which engages with a threaded spindle 13. The threaded spindle 13 comprises a first portion 13a without screwthread and a portion 13b with a screwthread 14. The screwthread 14 of the threaded spindle 13 engages with the inner screwthread 12 of the rotor 2. The threaded spindle 13 is locked against rotation by means of a bearing member 16. This is possible, for example, in that the bearing member 16 has a square inner recess, not shown, and a part 13c of the first portion 13a of the threaded spindle 13 is also square and engages the square inner recess of the bearing member 16. As a result of this, a rotation of the rotor 2 is converted into an axial movement of the threaded spindle 13 in the positive or the negative X direction. If the threaded spindle 13 is moved, for example, in the positive X direction and should exert a force, for example to drive an actuating member, during this movement in the positive X direction, the threaded spindle 13 will be subjected to a reaction force in the negative X direction, which reaction force should be taken up by the axial bearing 11. However, depending on its quality the axial bearing 11 exhibits a certain amount of axial bearing play between the inner race 11a and the outer race 11b. As a result of this, the rotor 2 may be moved in the negative X direction over a distance equal to the bearing play of the axial bearing 11. However, this axial movement of the rotor 2 in the negative X direction does not give rise to a reduction of the electromagnetic linkage of the electromagnetic flux generated by the stator coils 5 and 6 to the permanent magnet 10 of the rotor 22 as long as this axial movement in the negative X direction is smaller than the distance $S_1$ over which the permanent magnet 10 projects from the outer side 7 of the stator 1. Consequently, this does not lead to a reduction of the torque as a result of a reduced electromagnetic linkage between the stator 1 and the rotor 2. The bearing play of the axial bearing 11 can be chosen to equal the distance $S_1$ without causing a reduction of the torque of the claw-pole stepper motor.

The stator 1, the axial bearing 11 and the bearing member 16 are fixed in a housing, not shown, of the claw-pole stepper motor in a manner not shown.

I claim:

1. A claw-pole stepper motor having an axis of rotation, said motor comprising:

a stator (1) including at least two stator return elements (3, 4) disposed around said axis having respective axially-separated outer ends (7, 8), which elements each axially contain at least one stator coil (5, 6) wound around said axis;

a rotor (2) disposed for rotation about said axis, which rotor comprises a permanent magnet (10) and is axially supported by means of at least one axial bearing (11), the bearing (11) having an inner race (11a) which supports the rotor (2) and an outer race (11b) which is fixed with respect to the stator (1), the rotor (2) having an inner screwthread (12) in which a threaded spindle (13) is engageable;

wherein the permanent magnet (10) of the rotor (2) projects axially beyond at least one of the outer ends (7, 8) over at least 5% of the overall length of said permanent magnet and beyond all stator coils in such a manner that, in spite of a displacement of the rotor (2) as a result of axial play between the inner race (11a) and the outer race (11b) of the axial bearing (11), substantially the entire electromagnetic field of the stator coils (5, 6) is linked to the rotor (2).

2. A claw-pole stepper motor as claimed in claim 1, wherein the permanent magnet (10) of the rotor (2) projects beyond both outer ends (7, 8) of the stator return element (3, 4).

3. A claw-pole stepper motor as claimed in claim 2, wherein the permanent magnet (10) of the rotor (2) projects beyond both outer ends (7, 8) of the stator return element (3, 4) over at least 5% of the overall length of the permanent magnet (10) of the rotor (2).

* * * * *